(12) United States Patent
Gopal

(10) Patent No.: US 6,712,949 B2
(45) Date of Patent: Mar. 30, 2004

(54) ELECTROCHEMICAL SYNTHESIS OF HYDROGEN PEROXIDE

(75) Inventor: Ramanathan Gopal, Williamsville, NY (US)

(73) Assignee: The Electrosynthesis Company, Inc., Lancaster, NY (US)

( * ) Notice: Subject to any disclaimer, the term of this patent is extended or adjusted under 35 U.S.C. 154(b) by 0 days.

(21) Appl. No.: 10/199,719

(22) Filed: Jul. 19, 2002

(65) Prior Publication Data

US 2003/0019758 A1 Jan. 30, 2003

Related U.S. Application Data

(60) Provisional application No. 60/307,293, filed on Jul. 23, 2001.

(51) Int. Cl.$^7$ ................................ C25B 1/30
(52) U.S. Cl. ................... 205/466; 205/468; 204/263; 204/265
(58) Field of Search .............. 205/466, 468; 204/263, 265

(56) References Cited

U.S. PATENT DOCUMENTS

| | | | |
|---|---|---|---|
| 3,454,477 A | 7/1969 | Grangaard | 204/84 |
| 4,431,494 A | 2/1984 | McIntyre et al. | 204/83 |
| 4,533,443 A | 8/1985 | Wrighton et al. | 204/84 |
| 4,572,774 A | 2/1986 | Wrighton et al. | 204/238 |
| 4,576,756 A | 3/1986 | Wrighton et al. | 260/396 |
| 4,647,359 A | 3/1987 | Lindstrom | 204/294 |
| 5,112,702 A | 5/1992 | Berzins et al. | 429/17 |
| 5,358,609 A | 10/1994 | Drackett | 204/84 |
| 5,702,585 A | 12/1997 | Hillrichs et al. | 205/468 |
| 6,274,114 B1 | 8/2001 | Ledon et al. | 423/587 |

FOREIGN PATENT DOCUMENTS

| CN | 8703988 A | * 12/1988 |
|---|---|---|
| JP | 6200389 | 7/1994 |

OTHER PUBLICATIONS

Otsuka et al, One Step Synthesis of Hydrogen Peroxide Through Fuel Cell Reaction, Feb. 1989, Electrochimica Acta, vol. 35, No. 2 pp. 319–322.*

Tammeveski et al, "Surface redox catalysis for O2 reduction on quinone–modified glassy carbon electrodes" Aug. 2001, Journal of Electroanalytical Chemistry 515 pp. 101–112.*

Oxidation–Reduction Polymers (Redox Polymers) Harold G. Cassidy, Kenneth A. Kun Interscience Publishers, A division of John Wiley & Sons, New York–London–Sydney 1965.

One Step Synthesis of Hydrogen Peroxide Through Fuel Cell Reaction, Kiyoshi Otsuka and Ichiro Yamanaka, Department of Chemical Engineering, Tokyo Institute of Technology, Ookayama Keguro–ku, Tokyo 152, Japan, Electrochimica Acta. vol. 35, No. 2, pp. 319–322, 1990.

Simultaneous Electro Synthesis of Alkaline Hydrogen Peroxide and Sodium Chlorate, E.E. Kalu, C. Oloman, Department of Chemical Engineering, The University of British Columbia, Vancourver BC, V6T 1W5, Received Oct. 20, 1989; revised Mar. 17, 1990.

(List continued on next page.)

*Primary Examiner*—Arun S. Phasge
(74) *Attorney, Agent, or Firm*—Howard M. Ellis

(57) ABSTRACT

Improved methods and devices for the synthesis of hydrogen peroxide employing redox catalysts in a gas diffusion electrode or membrane electrode assembly in a semi-chemical/electrochemical system for the production of high purity, stable, usually acidic, aqueous solutions of peroxide at high conversion efficiencies without requiring organic solvents.

36 Claims, 7 Drawing Sheets-

OTHER PUBLICATIONS

The Use of Gas Diffusion Electrodes in the On–Site Generation of Oxidants and Reductants, P.C. Foller, R.J. Allen, R.T. Bombard, and R. Vora, E–TEK, Inc. 1 Mountain Road Framingham, MA 01701, The Fifth International Forum on Electrolysis in the Chemical Industry, Sponsored by the Electrosynthesis Company, Inc., Nov. 10–14, 1991 Fort Lauderdale, FL.

Processes for the Production of Mixtures of Caustic Soda and Hydrogen Peroxide via the Reduction of Oxygen, P.C. Foller, R.T. Bombard, Foller and Associates, Inc., 1205 Mellville Square, Unit 303, Richmond, CA 94804 USA, Received Sep. 9, 1994; revised Dec. 6, 1994.

Naphthoquinone–Silicate Based Gas Electrodes: Chemical –Electrochemical Mode of Operation—Journal of Electroanalytical Chemistry 504 (2001) 146–159, Leonid Rabinovich, Victor Glezer, Zhibin Wu, Ovadia Lev, Division of Environmental Sciences, Fredy and Nadine Herrmann School of Applied Science, The Hebrew University of Jerusalem, Jerusalem 91904, Israel Received Nov. 27, 2000: revised Jan. 18, 2001; accepted Jan. 22, 2001.

Surface Redox Catalysis for O2 Reduction on Quinone–Modified Glassy Carbon Electrodes, Kaido Tammeveski, Kyosti Kontturi, Richard J. Nichols, Robert J. Potter, Daivd J. Schiffrin, Journal of Electroanalytical Chemistry 515 (2001) 101–112, Received Apr. 10, 2001; revised Jul. 27, 2001; accepted Aug. 2, 2001.

* cited by examiner

ELECTROCHEMICAL SYNTHESIS OF HYDROGEN PEROXIDE

CROSS REFERENCE TO RELATED APPLICATION

This application claims the benefit of U.S. provisional application No. 60/307,293, filed Jul. 23, 2001.

GOVERNMENT LICENSE RIGHTS

This invention was made with United States Government support under Award No. 0078383, granted by the National Science Foundation. The United States Government has certain rights in the invention.

TECHNICAL FIELD

This invention relates generally to methods for the synthesis of stable, aqueous, mainly acidic solutions of hydrogen peroxide and improved electrocatalytic electrodes, cells and systems for more efficient production of high concentration peroxide solutions.

BACKGROUND OF THE INVENTION

Hydrogen peroxide is a strong oxidant, which is also an environmentally favored chemical for various applications, such as in chemical synthesis, water treatment, pulp and paper bleaching and waste treatment. Hydrogen peroxide is also widely used as an alternative for chlorine in view of its more benign affects on the environment. Use of hydrogen peroxide by various industries is such that the demand has been growing at a steady rate (>7% annually). Consequently, new and improved processes for commercial and on-site production of hydrogen peroxide would be of substantial interest to many industries.

Hydrogen peroxide has been produced by chemical methods, as well as electrochemical methods. Representative catalytic chemical methods include such processes as oxidation of secondary alcohols, e.g. isopropanol, to ketone and peroxide; anthraquinone auto-oxidation by cyclic reduction/oxidation; oxidation of alkali metals to peroxides; metal to peroxide followed by hydrolysis; synthesis by the direct combination of hydrogen and oxygen over noble metal catalyst, and so on.

The above mentioned cyclic anthraquinone process is an auto-oxidation process, often chosen for large scale manufacturing of hydrogen peroxide. This chemical process relies on mixed organic solvents to maximize the solubility of anthraquinone to achieve high yields of peroxide. In this process, an alkylanthraquinone, a quinoid, is chemically reduced with hydrogen in the presence of a catalyst to the corresponding 2-alkyl 9,10-dihydroanthraquinone. The 2-alkyl 9,10-dihydroanthraquinone is then oxidized in the presence of oxygen back to the corresponding quinoid, plus hydrogen peroxide. Desirably, the alkylanthraquinone is then available for separation and recovery as recycle in the further synthesis of hydrogen peroxide.

Some of the more significant problems associated with the cyclic anthraquinone process relate to peroxide contamination from the organic solvent system and the requirement of catalyst removal prior to the oxidation step as a safety precaution to avoid potentially explosive reactions. Consequently, several separation steps are required in the process. While a number of improvements have been made in the cyclic anthraquinone process, a purely aqueous process would be highly desirable for ease of operation.

Other significant problems associated with catalytic chemical methods have included potentially explosive reactions occurring, i.e., safety concerns with hydrogen and oxygen reacting; the generation of undesirable by-products, like acetone, and so on.

Generally, electrochemical methods for the synthesis of hydrogen peroxide offer some important advantages over chemical methods, including higher purity, fewer separation steps, fewer unwanted by-products, greater safety and fewer environmental concerns.

Representative methods for the electrochemical production of hydrogen peroxide include, for example, the electrolysis of ammonium sulfate followed by the hydrolysis of persulfate to peroxide; cathodic reduction of oxygen to alkaline peroxide solution; redox polymer with quinoid groups in the reduced form to effectuate oxygen reduction to peroxide; electrochemical reduction of a quinone to continuously regenerate hydroquinone in aqueous medium, etc.

Notwithstanding the number of substantial advantages associated with electrochemical synthesis methods for the production of hydrogen peroxide, some electrolytic processes have experienced shortcomings. For example, in the electrolytic method wherein sulfuric acid or sulfate salts of potassium, sodium or ammonium are oxidized to persulfate, capital equipment costs can be high due to costly platinum anodes corroding resulting in losses in valuable platinum metal.

The so called Dow Process for on-site electrolytic production of hydrogen peroxide employs cathodic reduction of oxygen in a trickle bed cell. The hydrogen peroxide solution is used directly for pulp bleaching, de-inking recycled paper, etc. However, the hydrogen peroxide produced according to this method has an alkaline pH, rendering it less stable. Consequently, alkaline pH peroxides produced by such methods are not entirely suitable for transportation, long-term storage, or for use in other applications, like mining, chemical synthesis, and certain environmental applications.

Formation of hydrogen peroxide through electrochemical oxygen reduction is described in several patents and technical publications, including U.S. Pat. No. 5,112,702 to Berzins et al; Canadian Pat. 2,103,387 to Drackett; German DE 4 311 665 to Hilricha, et al; Japan. Kokai JP 06,600,389 (1994) to Otsuka, et al; *Electrochem acta,* 35(2), 1990, 319–22. Kalu, et al, *J. Applied Electrochemistry,* 20, p. 932–940, 1990, describe a method for simultaneous production of sodium chlorate and hydrogen peroxide using a cathodic oxygen reduction cell. Foller et al, *J. Applied Electrochem.,* 25, p. 613–27, 1995, reported on the use of gas diffusion electrodes for the preparation of hydrogen peroxide. However, the peroxides had an alkaline pH, and were of generally poor stability.

While the chemical and electrochemical processes for the production of hydrogen peroxide each offer several important benefits, it would be highly desirable to have a modified process which offers the advantages of an aqueous medium for safety and environmental concerns, along with higher purity and minimal by-products of an electrochemical process, but which mimics certain features of established catalytic chemical process technology to enable the production of more stable peroxides at acid pH ranges, and at higher yields.

The literature describes methods relating to the preparation and use of redox polymers for the chemical and electrochemical synthesis of hydrogen peroxide. For example, Manecke, *Angew. Chem.,* 68, 582, 1956, used a redox polymer formed by the condensation polymerization of hydroquinone and formaldehyde. In a column reactor, workers were able to produce 2N hydrogen peroxide (3% by wt.)

by passing oxygen-saturated water and recycling through the bed. Manecke, et al, *Electrochem.,* 62, 311, 1958; Izoret, G., *Ann. Chim.*, (Paris), 7, 151, 1962 describe passing a solution of sodium dithionite or other reducing agent for regenerating a resin. U.S. Pat. No. 2,992,899 (Manecke) disclose a process for peroxide synthesis using an insoluble oxidation/reduction resin by passing oxygen saturated water through a bed of the resin.

U.S. Pat. No. 4,647,359 to Lindstrom discloses the preparation of electrocatalytic gas diffusion electrodes employing noble metal catalyzed carbon cloth.

U.S. Pat. No. 6,274,114 to Ledon et al disclose a two step electrochemical process for the generation of hydrogen peroxide wherein cobalt is oxidized in an electrochemical cell to form a $Co^{+3}$ complex, which is then reacted with oxygen to form peroxide and reduced cobalt ($Co^{+2}$).

In a 1969 patent, U.S. Pat. No. 3,454,477 to Grangaard, there is disclosed an electrochemical method for producing hydrogen peroxide using a quinone redox polymer deposited on a porous graphite cathode, and operated in an alkaline electrolyte. However, the performance of this system indicates poor stability of the electrode, as well as the production of peroxides at low concentrations generated at current efficiencies of less than 25%.

Accordingly, there is a need for more reliable and efficient semi-electrochemical/chemical or hybrid methods, apparatus and systems for the synthesis of hydrogen peroxide in stable aqueous medium at high concentrations, and which are suitable for scaling-up for large manufacturing installations, as well as for smaller on-site peroxide generation.

SUMMARY OF THE INVENTION

It is therefore one principal object of this invention to provide for improved methods for the synthesis of aqueous solutions of hydrogen peroxide which allow for the omission of organic solvents. The more environmentally acceptable and safer semi-electrochemical/chemical process enables the preparation of more stable, concentrated solutions of peroxides mostly in neutral to acid aqueous mediums, i.e., at pHs of 7 or less, and more preferably at pH ranges from about 0 to about 6 or less.

The methods of the present invention also provide for more efficient reduction of oxygen to peroxide than achieved heretofore, typically providing solutions of peroxides of about 1M or greater, at cathode current efficiencies of at least 35 percent, and more preferably, at efficiencies of at least 50 percent to as high as 95 percent, or more. The higher current efficiencies also translate into reduced power consumption.

Generally, the improved methods for the synthesis of hydrogen peroxide provide for:

passing a current through an aqueous electrolyte solution between an anode and cathode. The pH of the electrolyte solution prepared with a mineral acid or acid salt, preferably ranges from about 0 to about <7. The cathode comprises at least a redox catalyst and a conductive substrate therefor. The redox catalyst is one that possesses both oxidation and reduction states, and may be comprised of any suitable catalyst which is capable of reacting with oxygen when in a reduced (reduction) state to form hydrogen peroxide at current efficiencies of at least 35 percent, and is also capable of reduction electrochemically when in an oxidized (oxidation) state.

The method includes substantially simultaneously oxidizing water at the anode of an electrolytic cell to form oxygen and protons, which in-turn are transported to the cathode, preferably in the environment of a compartmentalized electrolytic cell to prevent destruction of peroxide at the counter electrode or anode. Simultaneously, the redox catalyst of the cathode, in the presence of the protons from the anodic reaction of water, is continuously reduced electrochemically, i.e., by cathodic reduction. The reduced electrocatalyst in-turn reacts with a source of oxygen, such as air or an oxygen supply introduced at the cathode to generate hydrogen peroxide, preferably at current densities of at least 50 $mA/cm^2$. The redox catalyst (bound to the cathode), which becomes oxidized in the process, is continuously regenerated electrochemically, i.e. cathodic reduction, for recycling and for further use in the process, and so on.

While syntheses are performed at cathode current efficiencies of at least 35 percent, the improved methods of the invention more often have been found to generate hydrogen peroxide solutions at more stable acid pHs at efficiencies from at least about 50 percent to about 99 percent, and at molar concentrations from about 1.0M to about 2.0M, and greater (about 3% or more). Because of the greater stability of the peroxide solution in the acidic pH range, the solutions can be concentrated further, if necessary, by distillation methods without degradation occurring.

While the foregoing reactions have been described as being performed in multiple steps, e.g., reactions at the anode, and at the cathode for purposes of clarity, it is to be understood the multiplicity of reactions taking place occur substantially simultaneously, and essentially in a single step.

It will be observed from the foregoing summary, the objectives of providing a method for the synthesis of solutions of peroxide without contamination from organic solvents, and further, without the usual multiple separation steps for avoiding potentially hazardous reactions from occurring, are achieved with the semi-electrochemical/chemical methods of the present invention.

It is yet a further object of the invention to provide novel catalytic electrodes, namely gas diffusion electrodes and membrane electrode assemblies (or solid polymer electrolytes) comprising the redox catalysts as described hereinabove, and electrolytic cells equipped therewith, including systems for large scale manufacturing and smaller on-site generators of hydrogen peroxide solutions according to methods herein described.

Also included within the objectives of this invention, are methods for the fabrication of the improved cathodes of the invention with suitable redox catalysts, such as quinone monomers or polymers including substituted and unsubstituted benzoquinone, anthraquinone, napthaquinone, and mixtures thereof. Other useful redox catalysts of the invention include azo compounds having the —N=N— structure, which have been found to provide for stable reduction reactions occurring over a broader pH range of 14 or less.

DESCRIPTION OF THE PREFERRED EMBODIMENTS

As described herein, the invention relates to a hybrid or semi-chemical/electrochemical system for the production of hydrogen peroxide which employs both chemical and electrochemical reactions in the synthesis of high purity, stable acidic, aqueous solutions of hydrogen peroxide at high conversion efficiencies without requiring organic solvents.

The methods for synthesis of peroxide solutions are conducted mainly in neutral to acid aqueous mediums, i.e., at pHs of 7 or less, and more preferably, at pH ranges from about 0 to about 6 or less, e.g., from about 0 to about 4. The reaction medium comprises electrolyte solutions comprising mineral acids, such as hydrochloric acid, nitric acid, phosphoric acid, sulfuric acid, etc. Oxidizing acids, like hydrochloric acid and nitric acid are less preferred than sulfuric and phosphoric acids in the methods of this invention. Alternatively, soluble salts may be used in place of the foregoing acids. For instance, sodium and potassium salts of the above mentioned acids are also suitable for use in practicing this invention. Electrolyte-containing solutions of $Na_2HPO_4$, $NaH_2PO_4$, and their potassium salts can also be used to operate in other pH regions.

Methods of the invention are performed in electrolytic cells equipped preferably with gas diffusion electrodes or membrane electrode assemblies (MEA), sometimes referred to as solid polymer electrolyte cells (SPE) having the appropriate redox catalysts.

Figure 1:
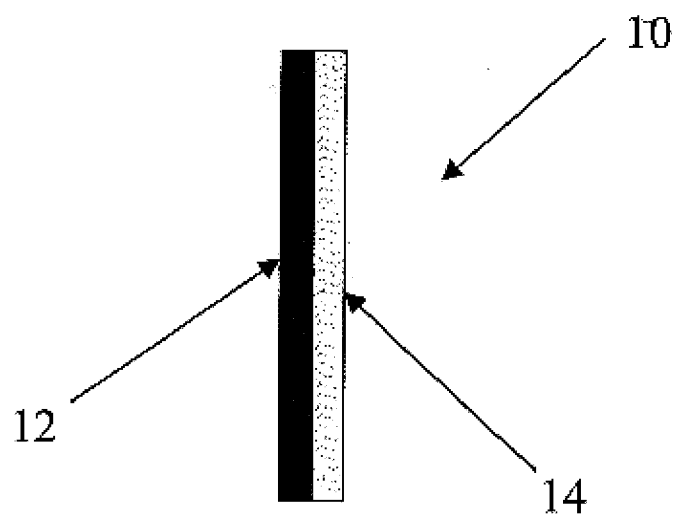
FIG. 1 is elevational view of a gas diffusion electrode for the electrosynthesis of hydrogen peroxide according to the present invention.

FIG. 1 illustrates one embodiment of a useful gas diffusion type electrode 10, as a cathode (−) for use in an electrolytic cell in practicing the methods of the invention. While the embodiment of a gas diffusion electrode illustrated comprises dual layers as main elements of electrode 10 with a catalyst-substrate layer 12 and a gas diffusion-support layer 14 therefor, it is to be understood the invention contemplates alternative air or gas diffusion cathode structures, such as deposition of a redox catalyst directly onto a high surface area cathode structure, such as carbon felts and porous carbon cloths, and so on, wherein a high surface area felt per se performs both as the substrate and also as a support for the redox catalyst. For purposes of this invention the expression "high surface area" or variations thereof, as appearing in the specification and claims is intended to mean surface areas in a range from about 20 to about 2000 $m^2/g$. In either case, the gas diffusion electrodes of the invention are porous structures allowing for the introduction and diffusion of a source of oxygen, either air or oxygen supply, for chemically reacting with the catalyst when in a reduced state for the production of hydrogen peroxide.

Catalyst-substrate layer 12 comprises a redox catalyst which is capable of reacting with the oxygen introduced into the electrode for reduction to hydrogen peroxide. In the process, the catalyst becomes oxidized, e.g. to the quinone. The oxidized catalyst bound to the electrode is "recycled" for further use in the process, by being cathodically reduced, e.g., back to the hydroquinone. Representative examples of useful catalysts include substituted and unsubstituted quinone compounds and quinone polymers. Representative examples include benzoquinone, anthraquinone, napthaquinone, and mixtures of the same. Other useful quinone type redox catalysts may also be substituted types, such as alizarin, quinizarin, anthraflavic acid, anthrarufin, 1,8 dihydroxy-anthraquinone, and so on.

Other useful representative redox catalysts include, but are not limited to, azo compounds having —N=N— groups, and includes such compounds as azobenezene, phenazine, etc.

By way of representation, a quinone type polymeric redox catalyst containing repeating units of quinone groups may be prepared, for instance, by known phenol-formaldehyde condensation polymerization methods. For example, a reaction mixture is first prepared with the quinone compound with hydroxy group substituents, e.g., anthraflavic acid, alizarin, quinizarin, 1,8 dihydroxy-anthraquinone, anthrarufin, and so on, by mixing with phenol, fomaldehyde and an aqueous solution of sodium hydroxide and refluxing at 60–80° C. for 3 to 4 hours. The resulting liquor is heat treated at 110° C. for 2 hours. The hardened material is then digested in water to remove any water soluble compounds. The resulting redox polymer can then be crushed to a fine powder and mixed with an appropriate electrically conductive, high surface area substrate material, such as activated carbon powder, e.g., Cabot's Vulcan® XC-72R, or any other high surface area amorphous carbon. Other representative examples of useful carbons are Shawinigan Black® from Chevron Phillips Chem. Co., LP; Black Pearl® brand from Cabot, Ketchen Black from Ralston Carbon Black Ltd., charcoal, and so on. The carbon substrate/catalyst mixture is preferably employed in a weight ratio of about 0.50:1.0 to about 2.5:1.

The gas diffusion electrode 10 can be prepared using the above catalyst-substrate mixture by incorporating a fluorocarbon polymer as a binder, such as Teflon® T-30 (E. I. DuPont) dispersion in water, and made into a paste by adding sufficient water. It is then bonded to a conductive carbon or graphite substrate. Other polymers in addition to PTFE can be used, especially halopolymers, containing fluorine atoms, including fluorochlorocarbon polymers. Representative useful polymers include polyvinylidene fluoride (PVDF), polyvinylfluoride (PVF), polychlorotrifluoroethylene (PCTFE), and so on. The fluorocarbon polymers are employed in amounts ranging from 10 to 50 percent by-weight.

Unexpectedly, it has been found that the performance of the redox catalyst-based cathodes of the invention in the synthesis of hydrogen peroxide can be greatly improved and enhanced by the introduction into the cathode of a further additive, namely a performance modifier or enhancer. It was found that certain classes and groups of compounds, monomeric and polymeric alike, are capable of imparting a buffering effect to the cathode surface enhancing conductivity, reducing surface tension, allowing more intimate contact of the aqueous electrolyte and oxygen at the interface with the catalyst. The beneficial effects of the cathode performance modifier or enhancer result in the cells operating at higher current densities, lower cell voltages and the production of hydrogen peroxide solutions of higher concentration than otherwise achieved with the same catalytic cathodes free of such performance modifiers/enhancers.

Representative examples of performance modifiers and enhancers of the invention are generally high molecular weight organic compounds and polymers, some of which may have surface active properties, and classified as cationic and nonionic surfactants, although surface active properties are not a prerequisite. Compounds, polymeric and monomeric alike, with and without positively charged nitrogen atoms are specially preferred, such as quaternary ammonium and pyridinium compounds, i.e. pyridine having a tetravalent nitrogen atom. Representative examples include higher molecular weight polymers like poly(4-vinylpyridinium-p-toluene sulfonate), polyvinyl pyridine, poly(4-vinylpyridine), poly(4-vinylpyridine)methylchloride quaternary salt, poly(4-vinyl pyridinium) tribromide. Nonionic surfactants are also useful, but should preferably be confined to those recognized as low or non-foaming types, such as Surfynol® from Air Products. An especially preferred additive is the poly(4-vinylpyridinium-p-toluene sulfonate) (PVPPTS).

The cathode performance enhancer is incorporated into the substrate/catalyst mixture in ranges generally from about 5 to about 70 percent by-weight based on the weight of catalyst present, and more preferably, from about 25 to about 50 percent by-weight.

Cathode support 14 may be a porous carbon cloth, carbon felt, carbon paper or other similar porous, high surface area conductive sheet material, which can also be metallic, such as porous nickel or titanium. However, carbon felts, paper and cloths are especially preferred. The support is initially wet proofed (made hydrophobic) by repeated application of a dilute solution of Teflon® (typically a 2–3 percent aqueous dispersion) followed by drying at 100 to 110° C. until the desired amount of Teflon (usually 3 to 40 weight percent) is deposited onto the support. A final heat treatment is applied to the support at a temperature ranging from about 300 to 350° C., melting the deposited Teflon, and providing the necessary wet proofing properties to carbon-support 14.

The catalyst paste is then applied to the wet proofed carbon cathode support 14 to form a smooth coating on the support. Any excess water is removed by pressing several times on paper. The resulting electrode is then heat pressed by placing it between two Teflon films in a press. The gas diffusion electrode 10 is pressed at a temperature in the range from about 50° to about 150° C., although about 120° C. is often preferred. Pressures of 500 to 2500 psi are applied for periods ranging from 15 to 60 minutes, although pressures of 2000 psi are preferred. The electrode is then peeled from the Teflon film, and finally cured in an oven at temperatures ranging from about 250° C. to about 350° C., usually for less than 10 minutes. Curing conditions of approximately 270° C. for about 5 minutes, are often preferred.

A membrane electrode assembly or MEA 16 (FIG. 2) is a composite structure having a cathode layer 18, an anode layer 20 and an ion exchange membrane 22 disposed between cathode 18 and anode 20. Like the gas diffusion electrode of FIG. 1 the MEA can also be used to operate an electrochemical cell for synthesis of hydrogen peroxide at low cell voltages with mainly water and a source of oxygen, either air or an oxygen supply.

Cathode layer 18 of MEA 16 is comprised of a mixture of a redox catalyst, as previously discussed in connection with gas diffusion electrodes of FIG. 1, and a substrate material therefor, preferably also a high surface area activated carbon, such as Vulcan® XC 72R, and other grades and brands as previously mentioned in connection with gas diffusion electrodes. The carbon-catalyst mixture, preferably containing the cathode performance enhancing additives, previously disclosed, are deposited onto ion exchange membrane 22 as cathode layer 18.

Ion exchange membrane 22 is usually a cation exchange type membrane, such as a perfluorosulfonic acid type, like Nafion® 115 commercially available from E. I. DuPont. This membrane selectively permits the transfer of positively charged protons generated at anode layer 20 through oxidation of water to cathode 18 where they are used in generating hydrogen peroxide. This is prompted through a chemical reduction reaction by the redox catalyst and oxygen introduced at the cathode layer. Similarly, cation exchange membrane 22 limits the negatively charged peroxide ions generated at the cathode 18 from being transported across to the anode side 20 of the MEA and become lost through oxidation.

Figure 2:
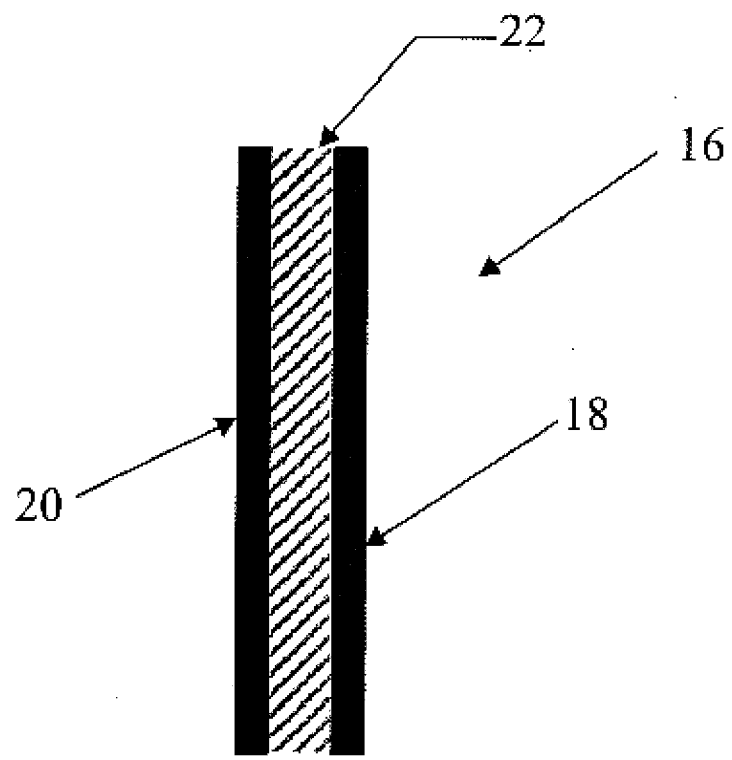
FIG. 2 is a elevational view of a membrane electrode assembly (MEA) for the electrosynthesis of hydrogen peroxide according to the present invention.

In a divided cell configuration employing an MEA with a cation exchange membrane, like that of FIG. 2, two modes of operation are contemplated. In a first mode, water is oxidized at the anode to oxygen and protons, in which case, anode 20 is preferably comprised of an iridium oxide coating for good stability against corrosion. As alternatives, platinum black catalyst or platinum on a carbon catalyst coating are also suitable as anode materials.

In a second mode of operation, hydrogen can be fed to a hydrogen peroxide generating cell equipped with an MEA, at the anode to produce protons ($H_2 \rightarrow 2H^+ + 2e^-$) which in-turn are transported across the membrane to the cathode layer. In this mode of operation, anode layer 20 of the MEA is preferably platinum black or platinum on carbon deposited onto membrane 22.

Figure 3:
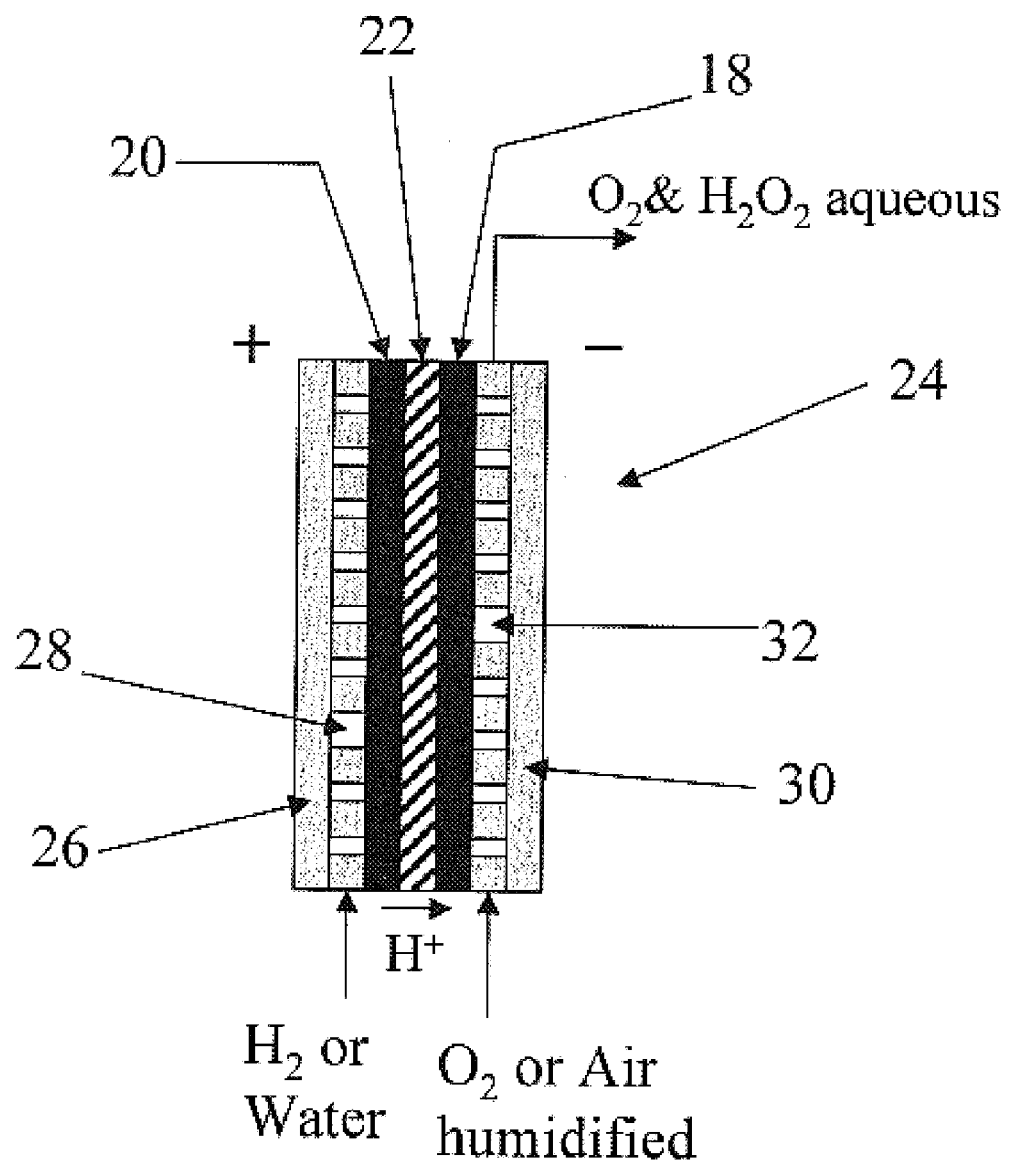
FIG. 3 is a diagrammatic view of an electrochemical cell with the membrane electrode assembly of FIG. 2 for the production of hydrogen peroxide.

FIG. 3, illustrates an electrochemical cell 24 operating with the MEA of FIG. 2 with anode 20, cathode 18 and ion exchange membrane 22 disposed between the anode and cathode. The anode side (+) comprises graphite current collectors 26 and flow channels 28, and the cathode side (–), likewise is equipped with graphite current collectors 30 with flow channels 32. With the application of a DC power supply, not shown, hydrogen gas or water is fed to the flow channels 28 on the anode side of the MEA for generating protons for transport to the cathode side. Simultaneously, oxygen or humidified air is fed to the cathode side (–), of cell 24 for reduction to hydrogen peroxide, which is taken off at the top of the cell with oxygen.

Figure 4:
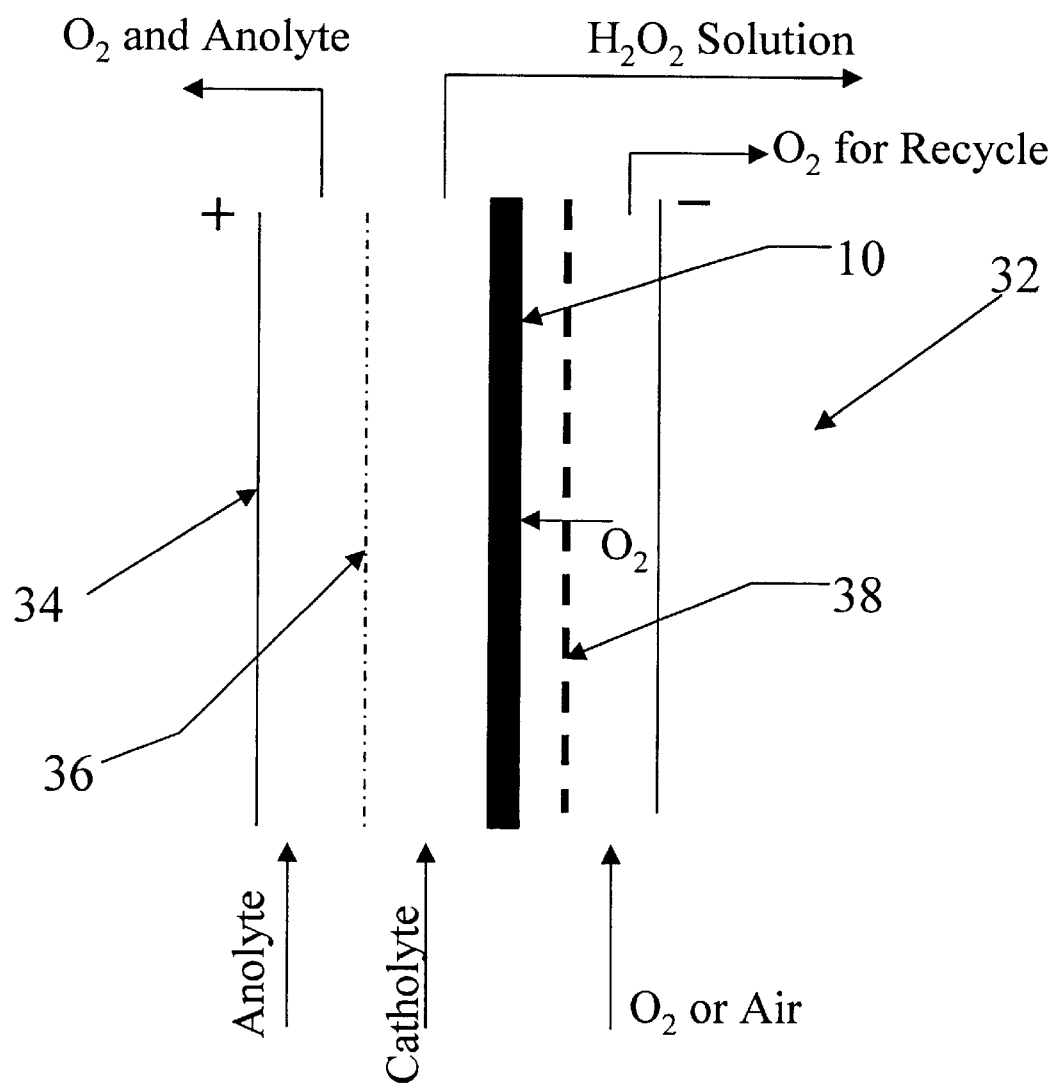
FIG. 4 is a diagrammatic view of an electrochemical cell with the gas diffusion electrode of FIG. 1 for the production of hydrogen peroxide.

In order to demonstrate the invention, hydrogen peroxide synthesis experiments were performed using flow cell design 32 (about 7 cm$^2$ electrode area) of FIG. 4. They were batch processes, although the invention contemplates continuous operation as an embodiment of the invention. The actual cell employed was a Micro Flow Cell™ commercially available from Electrocell AB (Sweden). The cell was equipped with two inlets and two outlets for both the anode and cathode compartments. This allowed for the introduction of oxygen and liquid catholyte to the appropriate section of cathode 10 as shown by FIG. 4. The inter-electrode gap was 4 mm or less for all experiments. The gas diffusion electrode 10 of FIG. 1 was employed, a platinum anode 34, and an ion exchange membrane 36 consisting of a Nafion 115 cation exchange membrane, was positioned between cathode 10 and anode 34 to divide the cell into anolyte and catholyte compartments. Oxygen was passed through the backside of the gas diffusion electrode at pressures ranging from 0.1 to 4 psig. The cell was operated at moderately low pressure (<3 psig) and at room temperatures in the range of 20 to 25° C., although higher operating temperatures are contemplated. A perforated graphite plate and current collector 38 are positioned on the backside of gas diffusion electrode 10. An electrolyte of sulfuric acid (0.1 to 2N) was circulated through the cell (anode and cathode) from individual reservoirs. The cathode reservoir contained 30 to 60 ml solutions, and the anode reservoir had 200 ml of solution. Hydrogen peroxide produced at the cathode was analyzed by titration against potassium permanganate.

EXAMPLE 1

A gas diffusion electrode without any catalyst was prepared with 0.45 g of Teflon® T-30 by mixing with 1.5 g of deionized water. 0.35 g of Cabot's Vulcan XC 72R carbon powder was weighed out and the Teflon water mixture added dropwise to make a paste.

A carbon cloth (0.3 to 0.4 mm thickness) consisting of knit fabric made from carbon fibers commercially available from Zoltek was used as the electrode support. Before applying the above paste to the cloth, it was first coated with Teflon in the form of a 3% dispersion to make the support hydrophobic. Several applications were made in order to apply 30% by-weight of the polymer followed by drying in an oven at 110° C. A final heat treatment of the support was performed at 350° C. in order to melt the deposited Teflon.

The paste was then applied onto the coated carbon cloth using a spatula and smoothed to form a uniform layer. Any excess water was blotted out with paper. The pasted composite was then heat pressed at 120° C. and pressure of 2500 psi for 20–30 minutes. The electrode thus obtained was then heat treated at 290° C. in an oven for not more than 5 minutes. The resulting gas diffusion electrode contained about 10–12 $mg/cm^2$ of solid (ie., carbon, Teflon). The final thickness of the electrode was from 0.45 to 0.5 mm.

The gas diffusion electrode was installed in the above test Micro Flow Cell (FIG. 4) as the cathode. The anode and cathode were separated by a Nafion 115 ion-exchange membrane. 1N $H_2SO_4$ (180 ml and 65 ml) was circulated through the anode and cathode compartments, respectively, while oxygen gas was passed through the back side of the gas diffusion electrode at about 2 psig. The cell was operated at 20 $mA/cm^2$ (0.12 amps) for 3 hours. Cell voltage was in the range of 2.2 to 2.5 volts. The final pH of the catholyte remained at about 0.50 to 0.70. The concentration of hydrogen peroxide produced was measured by titrating small aliquotes of solution with $KMnO_4$. The results are summarized in Table 1, below.

EXAMPLE 2

A gas diffusion electrode was prepared using a mixture of Vulcan XC 72R activated carbon and anthraflavic acid (2,6 dihydroxy anthraquinone) in amounts of 0.1 and 0.35 g, respectively. 0.45 g of Teflon T-30 was diluted with 1.5 g water for preparing a paste.

The protocol for preparing the electrode, including the electrode support, heat pressing, etc., were the same as disclosed in Example 1. The resulting gas diffusion electrode contained from 10 to 12 $mg/cm^2$ solids.

The electrode was tested in the Micro Flow Cell as previously discussed, according to the diagram of FIG. 4 using 1N $H_2SO_4$ as both anolyte and catholyte. Oxygen was introduced to the backside of the gas diffusion electrode at a pressure of up 2 psig. The cell was operated at 25 $mA/cm^2$ (0.16 amps) for up to six hours. The hydrogen peroxide solution (catholyte) pH remained at about 0.6 to 0.8, and the concentration of the hydrogen peroxide reached 0.2M, and leveled off at that point. Hydrogen peroxide formed in the catholyte was measured by titration with $KMnO_4$. The results are summarized in Table 1, below.

EXAMPLE 3

The same electrode as in Example 2 was used in another experiment wherein 3 mM cetyltrimethylpyridinium bromide, a cationic type surfactant, was added to the catholyte of the Micro Flow Cell used in Examples 1 and 2. Oxygen flow was introduced to the backside of the gas diffusion electrode at 1 to 2 psig while circulating the catholyte to the front face of the cathode. The cell was operated at 25 $mA/cm^2$ (0.16 amps) with a cell voltage ranging from 2.2 to 2.5 volts. The cell was operated for up to 6 hours with a final peroxide concentration reaching a limiting value of 0.2M.

The addition of this surfactant to the catholyte did not appear to improve hydrogen peroxide formation, as claimed by other researchers. The results of this experiment are shown in Table 1.

EXAMPLE 4

A gas diffusion electrode was prepared by mixing 0.18 g anthraflavic acid, 0.15 g poly(4-vinylpyridinium p-toluene sulfonate), and 0.35 g Vulcan XC 72R activated carbon (ground using mortar & pestle and mixed well). The paste, which was prepared using 1.5 g water and 0.45 g Teflon T-30 emulsion, was coated onto a Zoltek knit carbon cloth following the protocol of Example 1. Beforehand, the cloth was treated with Teflon to deposit up to 30% by-weight of the polymer to make it hydrophobic following the procedure of Example 1, and finally heated in the oven at 350° C. melt the polymer into the cloth.

The electrode was then tested in the Micro Flow Cell using the same arrangement of the above working Examples. The electrolyte was 1N $H_2SO_4$ solution for both the anolyte and catholyte compartments, but each solution was circulated separately from a reservoir. Oxygen flow was again maintained to the back side of the electrode at pressures of 1 to 2 psig. The cell operated at a higher current density 60 $mA/cm^2$ (0.36 amps) (verses only 25 $mA/cm^2$) for 7 hours during which time the hydrogen peroxide concentration reached a value of 0.6M The current efficiency improved along with the final peroxide concentration. The results are recorded in Table 1, below.

EXAMPLE 5

A condensation polymer was prepared by refluxing a mixture of anthraflavic acid, formaldehyde, 1N NaOH and hydroquinone in a molar ratio of 0.0025:0.015:0.015:0.006, respectively. The resulting mixture was heated in an oven at 115° C. for at least 2 hours. It was crushed and stirred in deionized water to remove any water soluble components. The resulting insoluble polymer was used to prepare a gas diffusion electrode.

A mixture of 0.18 g of the above polymer with 0.1 g poly(4-vinylpyridinium p-toluene sulfonate)(PVPPTS), and 0.35 g Vulcan XC 72R carbon were ground together. 0.5 g Teflon emulsion diluted with 1.6 g deionized water were mixed with the solid to form a paste.

A carbon cloth (Zoltek) having a thickness of 0.3 to 0.4 mm was made hydrophobic by depositing up to 30% by-weight of Teflon using Teflon T-30 emulsion to obtain a smooth hydrophobic coating. The final heat treatment for the cloth was 350° C. for one hour.

The above paste was then coated onto the treated carbon cloth. It was heat pressed at pressure of 2500 psi and 125° C. for 30 minutes. The cloth with paste coating was then heated in an oven at 290° C. for 5 minutes. The coating on the electrode contained 10–15 mg solid/$cm^2$.

The elctrode was tested in the flow cell (Micro Flow Cell) described above to determine the hydrogen peroxide formation efficiency. A 1N $H_2SO_4$ solution used as the anolyte and catholyte were circulated using a pump. Oxygen flow to the backside of the electrode was maintained at 1 to 2 psig. The cell was operated at a current density of 100 $mA/cm^2$, wherein the peroxide current efficiency improved to >90%. In addition, the concentration of hydrogen peroxide increased to 0.9M (about 3%). The details of the results are presented in Table 1.

Figure 5:
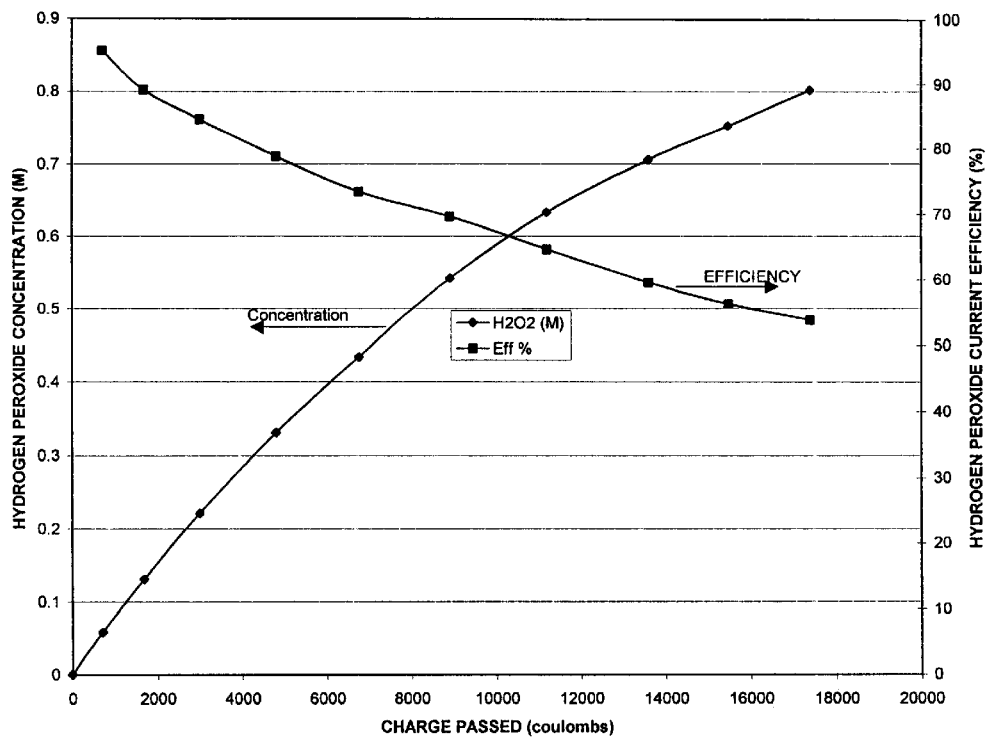
FIG. 5 is a plot of the performance of the electrosynthesis of hydrogen peroxide according to Example 5.

FIG. 5 demonstrates the changes in hydrogen peroxide concentration and current efficiency for oxygen reduction over the duration of the experiment. Initial current efficiency for hydrogen peroxide was 95%, or higher. However, as the hydrogen peroxide concentration increased, there was a decline in current efficiency for peroxide production. It is believed that the decline was due to low mass transfer rate for oxygen to the electrode surface, as well as hydrogen peroxide reaction at the electrode surface (oxidation of the catalyst competing with oxygen).

EXAMPLE 6

A gas diffusion electrode was prepared by first making a paste by mixing 0.18 g azobenzene and 0.35 g Cabot's Vulcan XC 72R activated carbon with 0.6 g Teflon dispersion diluted with 1.5 g water. The paste was prepared for application to a carbon cloth (hydrophobic).

The carbon cloth was the same as that used in the other Examples, namely Zoltek brand having a thickness of 0.3 to 0.4 mm. Before applying the paste, the cloth was made hydrophobic by depositing PTFE using Teflon T-30 emulsion. The final heat treatment for the cloth was in a laboratory oven at 350° C. for one hour.

The paste was then applied to the treated cloth which was then heat pressed at 120° C. and at a pressure of 2500 psi for 30 minutes. The coated cloth was then heated in the oven at 290° C. for 5 minutes to form the gas diffusion electrode.

This electrode (6.4 $cm^2$) was tested in the above described Micro Flow Cell configuration while circulating the 1N $H_2SO_4$ aqueous electrolyte solution to the front phase of the electrode. The cell was operated at 100 $mA/cm^2$ (0.64 amps and a cell voltage of 3.30 volts) for about 3 hours. The final hydrogen peroxide solution of <0.1M was reached. Hydrogen peroxide formation efficiency was relatively low (<20%). Details of the results are provided in Table 1, below.

EXAMPLE 7

The electrode from Example 6 was operated in the same Micro Flow Cell as Example 6. But, instead of using sulfuric acid electrolyte, a 0.2M aqueous solution of $Na_2CO_3$ was used The electrolyte pH for this experiment was about 11.

The experiment was conducted to determine whether the catalyst would be stable for operation at a pH>7. When compared to the quinone type catalyst, the azobenzene catalyst was found to be stable for operation in an alkaline pH range of >7. The cell was operated at 100 $mA/cm^2$ (0.64 amps and 2.5 volts). The oxygen flow to the back side of the cathode was maintained at a pressure of 2 psig. The final pH of the hydrogen peroxide solution was 11.7. The current efficiency and hydrogen peroxide concentration increased to 90% and 1.2 M, respectively.

This experiment demonstrated that azobenzene redox catalyst was suitable for operation in both neutral and alkaline pH conditions, and performed without instability. This experiment also demonstrated that azo type redox catalysts are suitable for preparing alkaline solutions of hydrogen peroxide at high efficiencies. Such alkaline solutions are useful in the pulp and paper industry. A summary of the results are provided in Table 1.

EXAMPLE 8

A gas diffusion electrode containing a mixture of azobenzene (0.14 g), poly 4-vinylpyridinium para-tolene sulfonate (0.15 g) and Vulcan XC 72R activated carbon (0.35 g) was mixed with 0.6 g Teflon emulsion diluted with 1.5 g water to form a paste.

The paste was then applied to a Teflon coated Zoltek brand carbon cloth (56 $cm^2$) having a thickness of 0.3 to 0.4 mm as prepared in the prior Examples, and heat pressed at 2500 psi and baked at 125° C. for 30 minutes. The electrode was then heated in an oven at 290° C. for 5 minutes.

The electrode was then tested in the same Micro Flow Cell used in the other Examples in an acid pH with a 1N $H_2SO_4$ electrolyte. The cell was operated at 100 $mA/cm^2$ (0.64 amps and 2.5 volts). Oxygen was introduced to the back side of the cathode at a pressure of 2 psig. The pH of the catholyte remained steady at 0.7 to 0.8 over the 28 hour period of the experiment. The results are summarized in Table 1. The current efficiency for peroxide formation improved to >95% along with high hydrogen peroxide concentration of >2M (about 7%).

Figure 6:
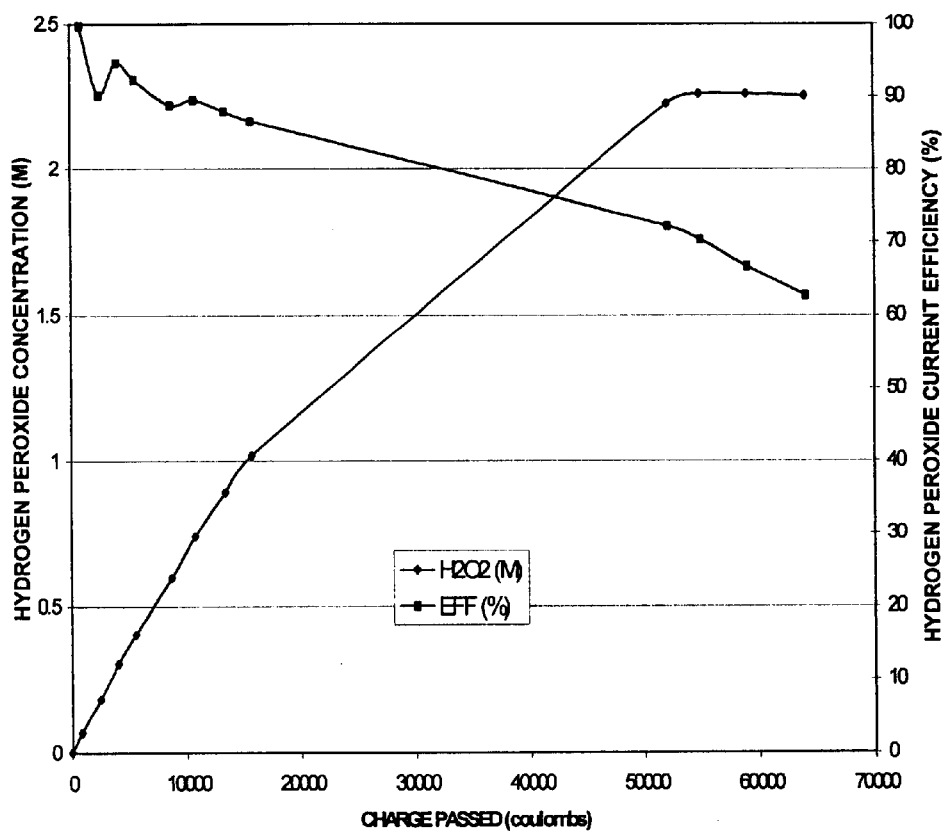
FIG. 6 is a plot of the performance of the electrosynthesis of hydrogen peroxide according to Example 8.

FIG. 6 of the drawing demonstrates the changes in hydrogen peroxide concentration and current efficiency during operation of the Flow Cell. Initial hydrogen peroxide current efficiency was as high as 99%. The concentration of hydrogen peroxide reached a maximum value of 2.2M (about 7%, the highest achieved over all the catalysts tested.)

EXAMPLE 9

In this experiment, four gas diffusion electrodes (cathodes) were prepared to determine the effect of electrode performance enhancer on cell performance and hydrogen peroxide production.

Each electrode contained 6,13 petacenequinone catalyst (0.14 g); varying amounts of poly(4-vinyl-pyridinium p-toluene sulfonate) enhancer (PVPPTS) ranging from 0 g; 0.05 g; 0.10 g and 0.20 g. All electrodes were prepared following the same protocols as disclosed in the prior Examples. The Micro Flo Cell also used in the prior Examples was used in this experiment. A solution of 1N $H_2SO_4$ was used as the electrolyte for both the anolyte and catholyte compartments (circulated separately from individual reservoirs). Oxygen flow to the back side of the cathode was maintained at a pressure of 2 psig. The cell was operated at a current density of 100 $mA/cm^2$ for all electrodes tested. Cell electrolyte was maintained at a temperature of 23° C. The results of operating the cell with cathodes having the four different electrocatalytic coatings is shown in Table 1 for comparison.

Generally, the results show improvement upon the addition of the quaternary ammonium polymer as a performance enhancer to the electrode. With as little as 0.05 g of the additive, PVPPTS, provided better than a four-fold improvement over the same cathode having 0.0 g of the performance enhancing additive. In addition to greater hydrogen peroxide concentration, current efficiency was also improved by the addition of the performance modifier to the electrode composition.

Figure 7:
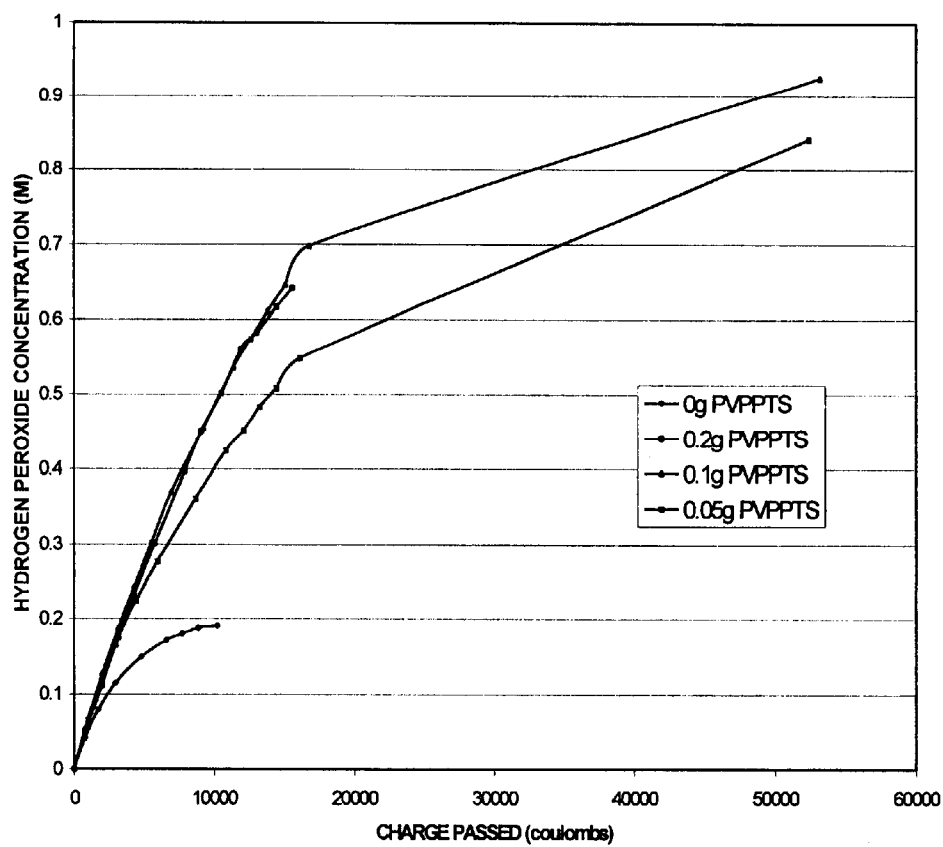
FIG. 7 is a plot of the performance of the electrosynthesis of hydrogen peroxide according to Example 9.

FIG. 7 illustrates comparatively the changes in hydrogen peroxide concentration for cell operation under the same conditions for the cathodes prepared with varying amounts of performance modifier in the electrocatalytic coatings. The electrode containing no modifier showed relative low performance ratings. But, with the addition of even minor amounts of the performance modifier to the electrode, peroxide production and conversion efficiencies were significantly improved.

peroxide analyzer (not shown) may be used for determining the hydrogen peroxide concentration. The peroxide product is drawn at the required rate from the catholyte tank for immediate use or to be stored in a holding tank for later use. A combination membrane evaporation and distillation of the peroxide product may be performed to produce up to 70% hydrogen peroxide solution.

TABLE 1

| EX No | Electrode Composition | Electrolyte | Current density mA/cm$^2$ | Electrode area (cm$^2$) | $H_2O_2$ Conc. (M) | $H_2O_2$ Efficiency (%) |
|---|---|---|---|---|---|---|
| 1 | Carbon only | 1N $H_2SO_4$ | 20 | 6.4 cm$^2$ | 0.02 | 15 |
| 2 | Anthraflavic acid & Carbon | 1N $H_2SO_4$ | 25 | 6.4 cm$^2$ | 0.2 | 25 |
| 3 | Same as above | 1N $H_2SO_4$ & Surfactant (3 mM) | 25 | 6.4 cm$^2$ | 0.2 | 25 |
| 4 | Anthraflavic acid polymer/Carbon/ PVPPTS | 1N $H_2SO_4$ | 60 | 6.4 cm$^2$ | 0.6 | 45–35 |
| 5 | Anthraflavic acid polymer/Carbon/ PVPPTS | 1N $H_2SO_4$ | 100 | 6.4 cm$^2$ | 0.9 | 95–60 |
| 6 | Azobenzene/Carbon | 1N $H_2SO_4$ | 100 | 6.4 cm$^2$ | 0.1 | 60–2.0 |
| 7 | Azobenzene/Carbon | 0.2M $Na_2CO_3$ | 100 | 6.4 cm$^2$ | 1.2 | 99–60 |
| 8 | Azobenzene/Carbon/ PVPPTS | 1N $H_2SO_4$ | 100 | 6.4 cm$^2$ | 2.2 | 99–60 |
| 9 | 6,13pentacenequinone/ Carbon/0.0 g PVPPTS | 1N $H_2SO_4$ | 100 | 6.4 cm$^2$ | 0.2 | 70–30 |
|  | 6,13pentacenequinone/ Carbon/0.05 g PVPPTS | 1N $H_2SO_4$ | 100 | 6.4 cm$^2$ | 0.85 | 85–40 |
|  | 6,13pentacenequinone/ Carbon/0.10 g PVPPTS | 1N $H_2SO_4$ | 100 | 6.4 cm$^2$ | 0.92 | 90–50 |
|  | 6,13pentacenequinone/ Carbon/0.20 g PVPPTS | 1N $H_2SO_4$ | 100 | 6.4 cm$^2$ | 0.7 | 80–45 |

PVPPTS refers to poly4-vinylpyridinium para-toluenesulfonate (quaternary salt polymer)

EXAMPLE 10

Figure 8:
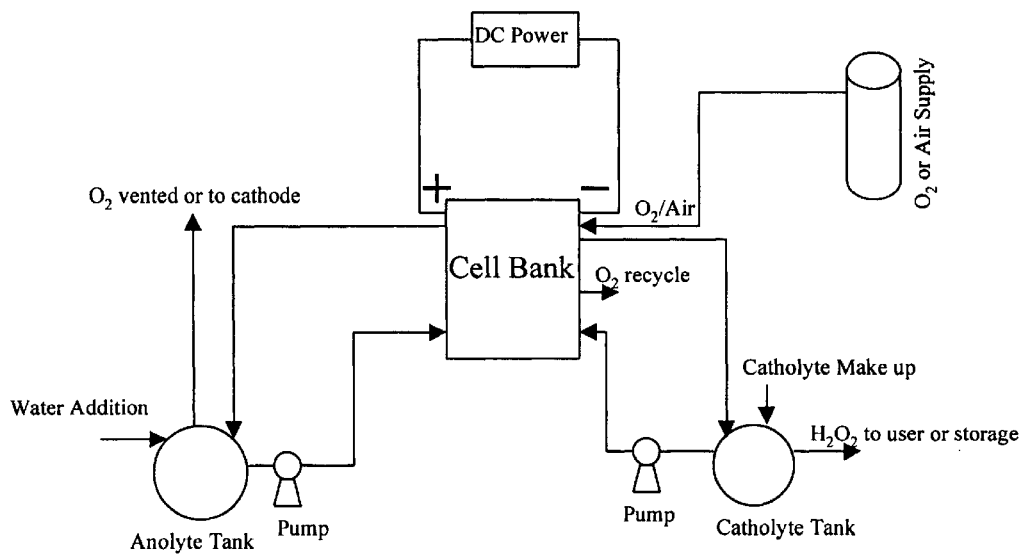
FIG. 8 is a schematic of a system incorporating the electrochemical cell and methods of this invention for synthesis of hydrogen peroxide according to Example 10.

FIG. 8 illustrates a system for practicing the methods of this invention employing electrochemical cells equipped with electrodes, i.e., gas diffusion cathodes or MEAs in electrolytic cells as disclosed hereinabove. Such a system has been scaled up for use as an on-site generator or dedicated large scale commercial production of hydrogen peroxide.

FIG. 8 is a flow chart of a system for production of hydrogen peroxide solution which may consist of a cell bank (up to 60 or 80 cells depending on power supply capacity) which is connected to a DC power supply for energizing the cells. The cells include anodes (DSA® for oxygen evolution), gas diffusion electrodes as cathodes and cation exchange membranes separating the anolyte and catholyte compartments. Separate holding tanks may be used as reservoirs for anolyte and catholyte solutions with pump means for circulating to the cells. Oxygen or air (as needed) flows to the back side of the cathode is maintained at the required pressure and flow rate using flow and pressure controllers (not shown). Oxygen generated at the anode by oxidation of water may be pressurized for use as a more economic supply at the cathode.

Hydrogen peroxide is generated through the reduction of oxygen at the cathode. The concentration of the peroxide solution increases with the passage of current. The peroxide product circulating through the cell from the catholyte tank is drawn out once the required concentration level has been reached, e.g., 3%, 5% or 7% solution. An on-line hydrogen In order to maintain a steady operation of the system, it is desirable to add make up solutions to the anolyte, as well as catholyte. Loss of water from oxidation of water at the anode to oxygen and protons lowers the liquid level in the anolyte, and therefore, water addition is necessary based on the anolyte tank level. Deionized water is pumped using a level controller signal from the anolyte tank.

Continuous removal of the peroxide product from the catholyte reservoir requires the addition of electrolyte, e.g. 1N sulfuric acid or salt solution at the required pH, to make up loss. The addition of the make up electrolyte is maintained by using a pump and flow controller (not shown) to match the product withdrawal rate.

I claim:

1. A method for the synthesis of hydrogen peroxide having a pH of 7 or less, which comprises:
   (i) passing a current through an aqueous electrolyte between an anode and cathode, said electrolyte having a pH of 7 or less, said cathode comprising a redox catalyst, said redox catalyst characterized as being suitable for reacting with oxygen when in a reduced state to form hydrogen peroxide and for reduction electrochemically when in an oxidized state, and
   (ii) substantially simultaneously oxidizing water at the anode to form protons while cathodically reducing the redox catalyst of the cathode in the presence of said protons while introducing a source of oxygen for reacting chemically with the reduced catalyst to form a solution of hydrogen peroxide at a current efficiency of at least 35 percent, and reducing the oxidized catalyst electrochemically for recycling.

2. The method of claim 1 wherein said electrolyte comprises an acid or salt suitable for providing a pH in a range from about 0 to about 6.

3. The method of claim 2 wherein said cathode is a gas diffusion electrode or a membrane electrode assembly.

4. The method of claim 2 wherein the redox catalyst comprises a member selected from the group consisting of a quinone monomeric compound, a quinone polymer and an azo compound.

5. The method of claim 2 wherein the redox catalyst comprises a substituted or unsubstituted quinone compound or polymer selected from the group consisting of benzoquinone, anthraquinone, napthaquinone, and mixtures thereof.

6. The method of claim 2 wherein the redox catalyst is a quinone compound or polymer selected from the group consisting of alizarin, quinizarin, anthraflavic acid, anthrarufin and 1,8 dihydroxy-anthraquinone.

7. The method of claim 2 wherein the redox catalyst comprises azobenzene.

8. The method of claim 2 wherein the cathode further comprises a sufficient amount of at least one electrode performance enhancer enabling synthesis of hydrogen peroxide at current densities of at least 50 mA/cm$^2$.

9. The method of claim 8 wherein the electrode performance enhancer is a monomeric or polymeric compound suitable for providing a hydrogen peroxide concentration of at least 3 percent.

10. The method of claim 9 wherein the electrode performance enhancer is a material selected from the group consisting of poly(4-vinylpyridinium-p-toluene sulfonate), polyvinyl pyridine, poly(4-vinylpyridine), poly(4-vinylpyridine)methylchloride quaternary salt, poly(4-vinyl pyridinium)tribromide, and mixtures thereof.

11. The method of claim 9 wherein the electrode performance enhancer is poly(4-vinylpyridinium-p-toluene sulfonate).

12. The method of claim 8 wherein the electrode performance enhancer is a quaternary ammonium compound or a pyridinium monomeric compound or polymer.

13. The method of claim 1, wherein the synthesis is performed in a compartmentalized electrochemical cell.

14. The method of claim 13, wherein the electrochemical cell is compartmentalized with an ion-exchange membrane.

15. A method for synthesis of hydrogen peroxide at a pH of 14 or less, which comprises passing a current through an aqueous electrolyte between an anode and a cathode, said cathode comprising at least an azo redox catalyst suitable for reacting with oxygen when said catalyst is in a reduced state to form hydrogen peroxide, and for reduction electrochemically when in an oxidized state.

16. The method of claim 15 wherein the pH of said electrolyte and hydrogen peroxide synthesized is in a range from about 7 to about 14.

17. The method of claim 15 wherein the pH of said electrolyte and the hydrogen peroxide synthesized is in a range from about 0 to about 7.

18. The method of claim 15 wherein said cathode further comprises at least one electrode performance enhancer suitable to enable synthesis of hydrogen peroxide at current densities of at least 50 mA/cm$^2$.

19. The method of claim 15 wherein said cathode is a gas diffusion electrode or a membrane electrode assembly.

20. The method of claim 19 wherein said cathode further comprises an electrode performance enhancer selected from the group consisting of a quaternary ammonium compound, or a pyridinium monomer or polymer.

21. A gas diffusion electrode for producing hydrogen peroxide in an electrochemical cell in an acid pH range, which comprises a high surface area electrically conductive carbon substrate and a redox catalyst, said catalyst and substrate deposited onto a conductive electrode support, said redox catalyst being suitable for reacting with oxygen when in a reduced state to form hydrogen peroxide at current efficiencies of at least 35 percent, and for reduction electrochemically when in an oxidized state.

22. The gas diffusion electrode of claim 21 which comprises a redox catalyst selected from the group consisting of a quinone monomeric compound, a quinone polymer and an azo compound.

23. The gas diffusion electrode of claim 22 wherein the redox catalyst is a quinone compound or polymer selected from the group consisting of alizarin, quinizarin, anthraflavic acid, anthrarufin and 1,8 dihydroxy-anthraquinone.

24. The gas diffusion electrode of claim 22, comprising at least one electrode performance enhancer enabling synthesis of hydrogen peroxide at current densities of at least 50 mA/cm$^2$.

25. The gas diffusion electrode of claim 24, wherein the electrode performance enhancer is a quaternary ammonium compound or a pyridinium monomer or polymer.

26. The gas diffusion electrode of claim 24 wherein the electrode performance enhancer is poly(4-vinylpyridinium-p-toluene sulfonate).

27. An electrochemical cell comprising the gas diffusion electrode of claim 21.

28. A system for synthesis of hydrogen peroxide comprising the electrochemical cell of claim 27.

29. A membrane electrode assembly for producing hydrogen peroxide in an electrochemical cell in an acid pH range, which comprises an anode layer, a cathode layer and a cation exchange layer disposed between said anode and cathode layers to form a composite structure, said cathode layer comprising a high surface area electrically conductive carbon substrate and a redox catalyst, said redox catalyst being suitable for reacting with oxygen when in a reduced state to form hydrogen peroxide at current efficiencies of at least 35 percent, and for undergoing reduction electrochemically when in an oxidized state.

30. The membrane electrode assembly of claim 29 wherein the redox catalyst is selected from the group consisting of a substituted and unsubstituted quinone monomeric compound, a quinone polymer and an azo compound.

31. The membrane electrode assembly of claim 30 wherein the redox catalyst is a quinone compound or polymer selected from the group consisting of alizarin, quinizarin, anthraflavic acid, anthrarufin and 1,8 dihydroxy-anthraquinone.

32. The membrane electrode assembly of claim 31, wherein the cathode layer comprises at least one electrode performance enhancer enabling synthesis of hydrogen peroxide at current densities of at least 50 mA/cm$^2$.

33. The membrane electrode assembly of claim 32, wherein the electrode performance enhancer is a quaternary ammonium compound or a pyridinium monomer or polymer.

34. The membrane electrode assembly of claim 32, wherein the electrode performance enhancer is poly(4-vinylpyridinium-p-toluene sulfonate).

35. An electrochemical cell comprising the membrane electrode assembly of claim 29.

36. A system for synthesis of hydrogen peroxide comprising the electrochemical cell of claim 35.

* * * * *